United States Patent [19]
Walters

[11] Patent Number: 5,767,472
[45] Date of Patent: Jun. 16, 1998

[54] METHOD OF REPAIRING A SPENT ELECTRODE FOR PLASMA ARC TORCH

[75] Inventor: Jeffrey K. Walters, Bradenton, Fla.

[73] Assignee: American Torch Tip Company, Bradenton, Fla.

[21] Appl. No.: 788,974

[22] Filed: Jan. 24, 1997

[51] Int. Cl.⁶ ..................................... B23K 10/00
[52] U.S. Cl. .............. 219/121.59; 219/119; 219/121.52; 29/402.08; 29/402.17
[58] Field of Search .............. 219/145.21, 121.52, 219/121.59, 74, 75, 118, 119; 29/402.08, 402.03, 402.09, 402.17

[56] References Cited

U.S. PATENT DOCUMENTS

| | | | |
|---|---|---|---|
| 4,455,471 | 6/1984 | Ecer et al. | 219/121.12 |
| 4,605,031 | 8/1986 | Grund | 137/15 |
| 4,782,740 | 11/1988 | Fagin et al. | 92/255 |
| 4,902,871 | 2/1990 | Sanders et al. | 219/121.49 |
| 5,187,347 | 2/1993 | Leef | 219/121.52 |
| 5,296,668 | 3/1994 | Foreman et al. | 219/121.48 |
| 5,632,078 | 5/1997 | Potter | 29/611 |

*Primary Examiner*—Mark H. Paschall
*Attorney, Agent, or Firm*—Sughrue, Mion, Zinn, Macpeak & Seas, PLLC

[57] ABSTRACT

A method of repairing a spent electrode for a plasma arc torch. The method includes removing an end piece of the spent electrode thereby leaving an electrode base. A blind bore is drilled into the end face of the electrode base. Internal female threads are then formed in the blind bore. A bevelled angle is machined at the entrance of the blind bore. Finally, a replacement end piece having a matching bevelled angle and threaded male portion is mated with the bevelled angle and internal threads, respectively, of the blind bore in the electrode base, thereby forming a rebuilt electrode.

7 Claims, 1 Drawing Sheet

METHOD OF REPAIRING A SPENT ELECTRODE FOR PLASMA ARC TORCH

BACKGROUND OF THE INVENTION

The present invention relates to a method of repairing a spent or used electrode for a plasma arc torch and, more particularly, to a novel method for repairing or replacing the tips of used or spent electrodes.

Commonly used for working of metals, plasma arc torches are used for cutting, welding, surface treatment, melting and annealing. These torches include an electrode that supports an arc that extends from the electrode to the workpiece in the transferred arc mode of operation. One of the major problems connected with plasma arc torches is the shortness of service life of their electrodes.

Conventionally, owners or users of welding equipment have had to purchase new electrodes to replace the spent electrodes that have been used to make from approximately 100 to 1,200 pierces, depending on the type of electrode used in the material which is being cut. For this reason, once the conventional electrode has served its useful life as noted above, the spent electrode was normally discarded.

SUMMARY OF THE INVENTION

It is an object of the present invention to permit users or owners of the above-described welding equipment to have the end pieces or electrode tips of the electrodes replaced or repaired at substantial savings. Moreover, once a spent or used electrode has been modified to accept the replaceable end piece, the user or owner of the welding equipment would then only have to order the replacement end pieces for the electrodes, thereby resulting in substantial savings to the user or owner.

In particular, the present invention provides a method of repairing a spent electrode for a plasma arc torch, the method comprising the steps of: removing an end piece of the spent electrode thereby leaving an electrode base; machining the electrode base to form a first mating portion; and joining a replacement end piece having a second mating portion to the first mating portion of the electrode base, thereby forming a rebuilt electrode.

The end piece of the spent electrode may be removed by cutting thereby leaving a substantially flat end face on the remaining electrode base. The machining of the electrode base to form the first mating portion may include the drilling of a blind bore in the end face of the electrode base, the formation of internal threads in the blind bore, and the machining of a bevelled angle at an entrance to the blind bore. The replacement end piece may be formed with a matching bevelled angle and threaded male portion which is designed to mate with the bevelled angle and the internal threads, respectively, of the blind bore in the electrode base.

BRIEF DESCRIPTION OF THE DRAWINGS

Other features and advantages of the present invention will be apparent from the following description taken in connection with the accompanying drawings, wherein.

DETAILED DESCRIPTION OF THE PREFERRED EMBODIMENT

Figure 1:
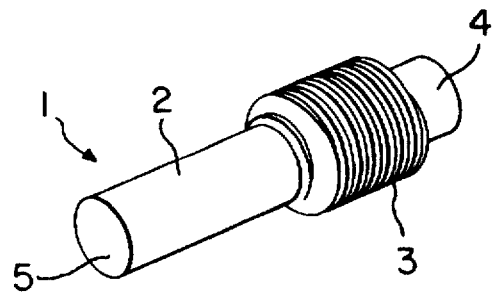
FIG. 1 is a perspective view of the conventional electrode for a plasma arc torch.

The invention will now be described with reference to the drawings. FIG. 1 shows the conventional plasma arc electrode as disclosed in detail in U.S. Pat. No. 4,902,871 (Sanders et al.) which issued on Feb. 20, 1990, and which is incorporated herein by reference. The operation of the plasma arc torch in which the electrode of the present invention is used is explained in detail in Sanders et al. '871 and the operation thereof forms no part of the present invention. The standard electrode 1 includes a lower electrode body portion 2, a spiral groove portion 3 for the passage of cooling gas as discussed in detail in Sanders et al. '871, and an upper electrode body portion 4. A lower end face 5 is designed to cooperate with a plasma arc exit orifice of the corresponding plasma arc torch.

When the conventional plasma arc electrode 1 as shown in FIG. 1 has served its useful life, the entire spent or used electrode is removed from the plasma arc torch and discarded. The user must then insert a brand new electrode 1 into the plasma arc torch.

Figure 2:
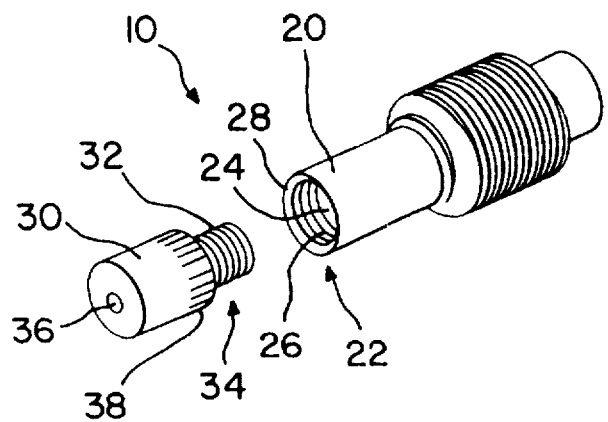
FIG. 2 is an exploded perspective view of a rebuilt electrode for a plasma arc torch according to the present invention.

However, according to the present invention, a method of repairing a spent electrode for a plasma arc torch is provided. In particular, according to the present inventive method, an end piece, which is preferably but not necessarily approximately ¼" of the lower electrode body portion 2 as measured from the lower end face 5, is removed from the spent electrode thereby leaving an electrode base. The electrode base is denoted by the reference numeral 20 in FIG. 2 which shows the finished rebuilt electrode in an exploded perspective view. The step of removing the end piece of the spent electrode may comprise cutting the end piece of the spent electrode thereby leaving a portion of the remaining electrode base with a substantially flat end face at a 90° angle with respect to the electrode base 20.

The substantially flat end face of the electrode base 20 is then machined with the various machining steps to form a first mating portion 22. The machining steps may include boring a blind bore 24 in the end face of the electrode base 20 such as, for example, by drilling. Further, internal female threads 26 are formed in the blind bore 24. A bevelled angle 28 is then machined at an entrance to the blind bore 24 and which leads up to the internal female threads 26. The bevelled angle 28 is preferably machined with a 45° lead angle (with respect to a plane of the end face of the electrode base 20) for simplicity, although other angles, of course, would be acceptable.

A replacement end piece 30, which generally corresponds in size to the end piece of the spent electrode which was removed and discarded, is utilized. However, the replacement end piece 30 of the electrode includes a matching bevelled angle, e.g., matching 45° angle, and a threaded male portion 32 having external threads designed to mate with the internal threads 26 of the blind bore 24 in the electrode base 20. The matching bevelled angle and the threaded male portion 32 form a second mating portion 34 designed to mate with the first mating portion 22 of the electrode base, thereby to form a rebuilt electrode as shown in exploded form in FIG. 2 of subject application. The matching male threaded portion 32 and internal female threads 26, along with the matching 45° bevelled angles formed at the opening of the blind bore 24 and on the mating surface of the replacement end piece 30, respectively, serve to ensure good concentricity and electrical contact between the electrode base 20 and the replacement end piece 30.

Once the remaining electrode base 20 is properly prepared according to the present invention to receive the corresponding replacement end piece 30, replacement end pieces can be easily replaced without damaging the refashioned electrode base 20. This will result in a cost savings of 25% to 75% to the users of the electrodes. In short, once the electrode base 20 has been refashioned according to the present invention, from then on, the user need only obtain replacement end pieces 30 each of which screws directly into the refashioned electrode base 20 remaining from the original electrode. In addition to cost savings, the present invention also reduces the amount of waste discarded after an electrode has been used since only the tip end portion is removed and thrown away as opposed to the entire electrode.

The electrode, including the electrode base 20 and the replacement end piece 30, is normally formed from a metal selected from the group consisting of copper and copper alloys. Moreover, an emissive insert 36 may be disposed in the outer end face of the replacement end piece 30. The emissive insert 36 is composed of metallic material such as hafnium, zirconium, tungsten, and alloys thereof.

A knurled surface as denoted by reference No. 38 may be formed on the replacement end piece 30 to facilitate mating of the replacement end piece 30 with the refashioned electrode base 20.

While the present invention has been described with respect to a preferred embodiment, it will be understood that various modifications and alterations will occur to those skilled in the art from the foregoing detailed description and the accompanying drawings. For example, while the invention has been described with reference to an electrode having a spiral groove cut in a outer surface of a shoulder portion and which electrode is movable axially for contact starting as disclosed in detail in Sanders et al. '871, the present method of repairing a spent electrode is not limited to the electrode of the type described in Sanders et al. '871 but could be applied to stationary electrodes and plasma arc electrodes in general.

What is claimed is:

1. A method of repairing a spent electrode for a plasma arc torch, said method comprising the steps of:
    a) removing an end piece of the spent electrode thereby leaving an electrode base;
    b) machining the electrode base to form a first mating portion; and
    c) joining a replacement end piece having a second mating portion to said first mating portion of the electrode base, thereby forming a rebuilt electrode.

2. The method of claim 1, wherein said step of removing the end piece comprises cutting the end piece from the spent electrode thereby leaving an electrode base with a substantially flat end face.

3. The method of claim 2, wherein said step of machining the electrode base comprises drilling a blind bore in the end face of the electrode base.

4. The method of claim 3, wherein said step of machining the electrode base further comprises forming internal threads in the blind bore, and machining a bevelled angle at an entrance to the blind bore.

5. The method of claim 4, wherein the bevelled angle is approximately 45 degrees with respect to a plane of the end face of the electrode base.

6. A method of repairing a spent electrode for a plasma arc torch, said method comprising the steps of:
    a) removing an end piece of the spent electrode thereby leaving an electrode base;
    b) boring a blind bore in the electrode base;
    c) forming internal threads in the blind bore; and
    d) threadedly mating a replacement end piece with the internal threads of the blind bore in the electrode base, thereby forming a rebuilt electrode.

7. A method of repairing a spent electrode for a plasma arc torch, said method comprising the steps of:
    a) cutting an end piece of the spent electrode thereby leaving an electrode base with a substantially flat end face;
    b) drilling a blind bore in the end face of the electrode base;
    c) forming internal threads in the blind bore;
    d) machining a bevelled angle at an entrance to the blind bore; and
    e) mating a replacement end piece having a matching bevelled angle and threaded male portion with the bevelled angle and the internal threads, respectively, of the blind bore in the electrode base, thereby forming a rebuilt electrode.

* * * * *